United States Patent Office 2,814,631
Patented Nov. 26, 1957

2,814,631
STEROID COMPOUNDS

David H. Gould, Leonia, N. J., assignor to Schering Corporation, Bloomfield, N. J., a corporation of New Jersey No Drawing. Application January 14, 1957, Serial No. 633,850

7 Claims. (Cl. 260—397.45)

My invention relates to a new group of therapeutically useful steroid compounds. More particularly my invention relates to 16-hydroxylated 1,4,6-pregnatrienes having the following formula:

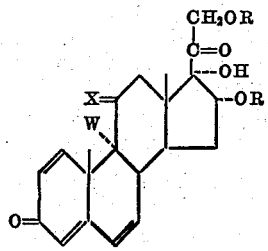

wherein X is a member of the group represented by O and (H,OH), W is a member of the group consisting of hydrogen and fluorine while R is a member of the group consisting of H, lower alkanoic acid radicals and other ester groups described below.

The compounds of the general formula wherein W represents fluorine may be considered solely for this discussion as evolving from 9α-fluoroprednisolone (9α-fluoro-1,4-pregnadiene-11β,17α,21-triol-3,20-dione). This diene compound is known to have a highly potent gluco-corticoid activity useful in treating inflammatory processes, but it also has an extremely high activity as a mineralo corticoid. This latter effect prevents its use for treatment of arthritis since the concomitant retention of sodium and water causes severe edematous reactions. On the other hand, 16α-hydroxy cortisone and 16α-hydroxy hydrocortisone have been reported (Allen et al., J. Am. Chem. Soc., 78, 1909 (1956)) to have recognizable glucocorticoid activity in animals. The activity is, however, of too low a value to be of use in the treatment of arthritis.

I have found that introducing further unsaturation into the A and B rings of 16α-hydroxy cortisone or 16α-hydroxy hydrocortisone increases the antiarthritic activity to a therapeutically useful level without, however, causing a concomitant increase in salt retaining activity. I have also found that introducing into 9α-fluoroprednisolone, further unsaturation in the B-ring together with a 16α-hydroxy group, reduces the undesirable mineralocorticoid activity but does not markedly alter the glucocorticoid property. Thus my new compounds possess a favorable ratio of glucocorticoid activity vs: mineralo corticoid activity lending themselves to application in the treatment of inflammatory conditions such as arthritis. The compounds of my invention may be used in the form of their ester derivatives at the 16- and 21-hydroxyl groups, e. g. combinations and particularly 21-esters.

As with other corticosteroids, esterification is of some value in extending the duration of activity, as for example with the acetate, propionate, iso-valerate, enanthate, cyclopentylpropionate. Also valuable are the phenoxyacetates and substituted phenoxyacetates such as 4-chloro-2,4-dichloro-, 4-bromo-, 4-methyl-, 4-tertiary butyl-2,4,5-trichloro-, and 4-methoxyphenoxyacetates. Especially valuable are the furoates and substituted furoates including the 5-bromo-, 5-chloro-, 5-methyl-, 5-tertiary butyl-furoates.

They may also be used in the form of their water soluble ester derivatives at C-16 and C-21, such as monosodium salts of acids such as succinic, phthalic, sulfuric, phosphoric, and the like, and esters with glycinic or gluconic acid.

The compounds may be administered orally in the form of tablets or capsules, or parenterally as aqueous or oil suspensions or solutions; or they may be applied topically in the form of lotions, ointments or suspensions.

The new compounds of my invention may be prepared by a wide variety of reaction schemes. I prefer to employ as starting material a steroid which differs from the final product only in the number of double bonds. By way of further example, I prefer to start with a 4-pregnene or a 1,4-pregnadiene and introduce the additional double bonds by analogous procedures described in the literature such as halogenation followed by dehydrohalogenation.

The following examples are illustrative of methods for the manufacture of my new compounds. It will be apparent to one skilled in the art that other methods of synthesis are equivalent and may be applied with equal advantage.

I. *6-bromo-9α-fluoro-1,4-pregnadiene-11β,16α,17α,21-tetrol-3,20-dione 16,21-diacetate*

A sample of 2 g. of 9α-fluoro-1,4-pregnadiene-11β,16α,17α,21-tetrol-3,20-dione diacetate is dissolved in 100 ml. of chlorobenzene and 50 ml. of carbon tetrachloride, and the solution is dried by distilling 5 ml. of solvent. To the solution is added 1.4 g. of N-bromosuccinimide and the mixture is irradiated with a 200-watt photoflood lamp and refluxed for 15 minutes during which time succinimide crystallizes out. The mixture is cooled and washed with water, and the organic solution is dried, filtered and evaporated in vacuo yielding the intermediary 6-bromo compound of this example. The ultraviolet spectrum of a sample of the crude residue shows λ max.= 245 mμ.

II. *9α-fluoro-1,4,6-pregnatriene-11β,16α,17α,21-tetrol-3,20-dione 16,21-diacetate*

To 15 ml. of refluxing dry 2,4-lutidine is added the residue of Example I. After 30 minutes boiling during which solid precipitates, the mixture is cooled, poured into ice and water and the pH adjusted to 4–6 with dilute hydrochloric acid. The mixture is extracted three times with 100 ml. each of methylene chloride. The methylene chloride solution is washed with water, dried, filtered and evaporated to dryness.

The residue is dissolved in a minimum of methylene chloride and chromatographed on activated magnesium silicate using ether to develop the column. The eluant is methanol-methylene chloride. The fraction eluted with 0.5% methanol in methylene chloride is the product of this example which is crystallized from acetone-hexane, ultraviolet spectrum λ max.=223, 255, 297 mμ.

III. *9α-fluoro-1,4,6-pregnatriene-11β,16α,17α,21-tetrol-3,20-dione*

A mixture is prepared of 1 g. of yeast extract concentrate and 1 ml. each of 2 M. potassium dihydrogen phosphate and 2 M. disodium phosphate in each 100 ml. Ten Erlenmeyer flasks (300 ml.) containing 100 ml. each are sterilized and inoculated with *Flavobacterium dehydrogenans* var. *hydrolyticus*, as described in copending application 458,661, filed September 27, 1954. The flasks are shaken at 30° for 16 hours, and to each is added a solution of 50 mg. of the product of Example II in 5 ml. of methanol. The cultures are shaken at 30° for 24 hours and the combined broths are extracted three times with 300 ml. of methylene chloride and the extract is dried, filtered and evaporated to dryness. The residue is crystallized from acetone-hexane yielding the product of this example.

IV. 9α-fluoro-1,4,6-pregnatriene-16α,17α,21-triol-3,11,20-trione 16,21-diacetate Two grams of the product of Example II is dissolved in 20 ml. of pyridine and added with stirring to a cooled slurry of 1 g. of chromic anhydride in 20 ml. of pyridine. The mixture is stirred overnight at room temperature, and then diluted with 40 ml. of 10% aqueous sodium sulfite, followed by stirring for 2 hours. The mixture is acidified with aqueous sulfuric acid and extracted with methylene chloride. The methylene chloride solution is washed with water until neutral, dried, filtered and evaporated to a residue. The residue is crystallized from acetone-hexane yielding the diester of this example.

V. 9α-fluoro-1,4,6-pregnatriene-16α,17α,21-triol-3,11,20-trione

By substituting the compound of Example IV in the saponification procedure of Example III affords the compound of this example which is purified by crystallization from ethyl acetate.

VI. 4-pregnene-11β,16α,17α,21-tetrol-3,20-dione tetra-acetate 5 g. of 4-pregnene-11β,16α,17α,21-tetrol-3,20-dione 16,21-diacetate is suspended in 75 ml. of acetic acid and 75 ml. of acetic anhydride and to this is added 1.0 g. of p-toluene sulfonic acid. The mixture is stirred until homogeneous and is then stored at room temperature for 48 hours.

The solution is treated with 50 ml. of water and is stirred at room temperature for 1 hour. One gram of sodium acetate is added and the mixture is refluxed 1 hour, cooled, diluted with 1 liter of water and extracted four times with 400 ml. of methylene chloride. The combined extracts are washed twice with 500 ml. of water and evaporated to dryness in vacuo. The residue is crystallized from acetone-hexane yielding the tetra-acetate of this example.

VII. 2,6-dibromo-4-pregnene-11β,16α,17α,21-tetrol-3,20-dione-tetra-acetate

To 10.0 g. of the product of Example VI dissolved in 500 ml. of acetic acid and 110 ml. of methylene chloride is added 10 drops of 4N hydrogen bromide in acetic acid. A solution of 7.3 g. of bromine in 5.5 ml. of acetic acid is added dropwise over 45 minutes; the rate of addition following the rate of decolorization. The pale yellow solution is stirred for 4 hours and then diluted with water and extracted with methylene chloride.

The organic layer is washed with water and dried over anhydrous magnesium sulfate. The solution is then filtered and evaporated to dryness in vacuo. Crystallization from aqueous acetone affords 5.0 g. of the dibromo compound of this example as a pale yellow solid, ultraviolet spectrum, ε=7,900 (at 240 mμ in ethanol).

VIII. 1,4,6-pregnatriene-11β,16α,17α,21-tetrol-3,20-dione tetra-acetate

To 40 ml. of γ-collidine is added 2.0 g. of the 2,6-dibromide of Example VII and the solution is refluxed for 40 minutes. After cooling, the mixture is poured into ice water; the pH is adjusted with dilute sulfuric to about 5, and the separated solid is extracted with methylene chloride. The organic solution is washed with water until neutral and dried over magnesium sulfate. The filtered solution is evaporated to dryness and chromatographed on 35 g. of activated magnesium silicate.

After being washed with hexane, the column is eluted with 75% ether in hexane to give the triene of this example whose u. v. spectra shows absorption maxima at 222 mμ, 254 mμ, and 296 mμ. The product is crystallized from acetone-hexane.

IX. 1,4,6-pregnatriene-11β,16α,17α,21-tetrol-3,20-dione

A sample of 5 g. of the product of Example VIII is treated as in Example III. Purification by crystallization from ethyl acetate yields the compound of this example.

X. 1,4,6-pregnatriene-11β,16α,17α,21-tetrol-3,20-dione 16,21-diacetate

A sample of 4 g. of the product of Example IX is dissolved in 40 ml. of pyridine and treated at room temperature with 2 ml. of acetic anhydride. The solution is allowed to stand 16 hours and is then poured into 200 ml. of water and acidified with dilute hydrochloric acid. The mixture is stirred 2 hours, extracted with methylene chloride and the organic layer is washed neutral with water. The organic layer is dried, filtered and evaporated to a residue which upon crystallization from ethyl acetate affords the diester of this example.

XI. 1,4,6-pregnatriene-16α,17α,21-triol-3,11,20-trione 16,21-diacetate

A sample of 1 g. of the product of Example X is treated as in Example IV with 0.5 g. of chromic anhydride in 20 ml. of pyridine yielding the product of this example which is crystallized from acetone-hexane.

XII. 1,4,6-pregnatriene-16α,17α,21-triol-3,11,20-trione

A sample of 0.25 g. of the product of Example XI is hydrolyzed as in Example III. The product, the above identified triene, is crystallized from ethyl acetate, and exhibits ultraviolet absorption maxima at 222 mμ, 255 mμ, and 295 mμ.

I claim:
1. Pregnatrienes having the following formula:

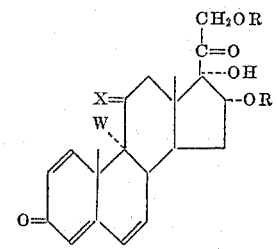

wherein X is a member of the group consisting of O and (H,OH), W is a member of the group consisting of H and F and R is a member of the group consisting of H and lower alkanoic acid radicals.

2. 9α-fluoro-1,4,6-pregnatriene - 11β,16α,17α,21 - tetrol-3,20-dione 16,21-diacetate.

3. 9α-fluoro-1,4,6-pregnatriene - 11β,16α,17α,21 - tetrol-3,20-dione.

4. 9α-fluoro-1,4,6-pregnatriene-16α,17α,21-triol-3,11,20-trione 16,21-diacetate.

5. 9α-fluoro-1,4,6-pregnatriene-16α,17α,21-triol-3,11,20-trione.

6. 1,4,6-pregnatriene-11β,16α,17α,21-tetrol-3,20-dione.

7. 1,4,6-pregnatriene-11β,16α,17α,21 - tetrol-3,20-dione 16,21-diacetate.

References Cited in the file of this patent

UNITED STATES PATENTS 2,736,734     Sarett                Feb. 28, 1956